(No Model.)  8 Sheets—Sheet 1.

J. D. WILLIAMSON, Jr.
ELECTRICAL STEERING GEAR.

No. 591,995. Patented Oct. 19, 1897.

WITNESSES:

INVENTOR

BY

ATTORNEY

(No Model.)  J. D. WILLIAMSON, Jr.  8 Sheets—Sheet 3
ELECTRICAL STEERING GEAR.

No. 591,995.  Patented Oct. 19, 1897.

(No Model.)　　　　J. D. WILLIAMSON, Jr.　　　8 Sheets—Sheet 4.
ELECTRICAL STEERING GEAR.

No. 591,995.　　　　　　　　　Patented Oct. 19, 1897.

(No Model.) 8 Sheets—Sheet 5.

J. D. WILLIAMSON, Jr.
ELECTRICAL STEERING GEAR.

No. 591,995. Patented Oct. 19, 1897.

(No Model.) 8 Sheets—Sheet 6.

J. D. WILLIAMSON, Jr.
ELECTRICAL STEERING GEAR.

No. 591,995. Patented Oct. 19, 1897.

WITNESSES:
INVENTOR
BY
ATTORNEY (No Model.) 8 Sheets—Sheet 7.

J. D. WILLIAMSON, Jr.
ELECTRICAL STEERING GEAR.

No. 591,995. Patented Oct. 19, 1897.

WITNESSES:
Edward C. Rowland
Francis P. Reiley

INVENTOR
J. D. Williamson Jr.
BY
ATTORNEY (No Model.)    J. D. WILLIAMSON, Jr.    8 Sheets—Sheet 8.
ELECTRICAL STEERING GEAR.

No. 591,995.    Patented Oct. 19, 1897.

WITNESSES:
Edward C. Rowland
Francis P. Reiley

INVENTOR
J. D. Williamson Jr.
BY
ATTORNEY

United States Patent Office.

JOHN D. WILLIAMSON, JR., OF PHILADELPHIA, PENNSYLVANIA, ASSIGNOR TO WILLIAMSON BROTHERS CO., OF SAME PLACE.

ELECTRICAL STEERING-GEAR.

SPECIFICATION forming part of Letters Patent No. 591,995, dated October 19, 1897.

Application filed May 15, 1894. Serial No. 511,341. (No model.)

*To all whom it may concern:*

Be it known that I, JOHN D. WILLIAMSON, Jr., of the city and county of Philadelphia, in the State of Pennsylvania, have invented a new and useful Telemotor for Transmitting Electricity, which invention is fully set forth and illustrated in the following specification and accompanying drawings.

The object of this invention is to provide an electric telemotor which shall transmit motion between distant points by means of an electric current, the apparatus being adapted to operate the steering mechanism of a vessel, a turn-table, or other mechanism, in particular where motion of an intermittent character is desired.

The invention will first be described in detail and then set forth in the claims.

In the accompanying drawings.

Figure 1:
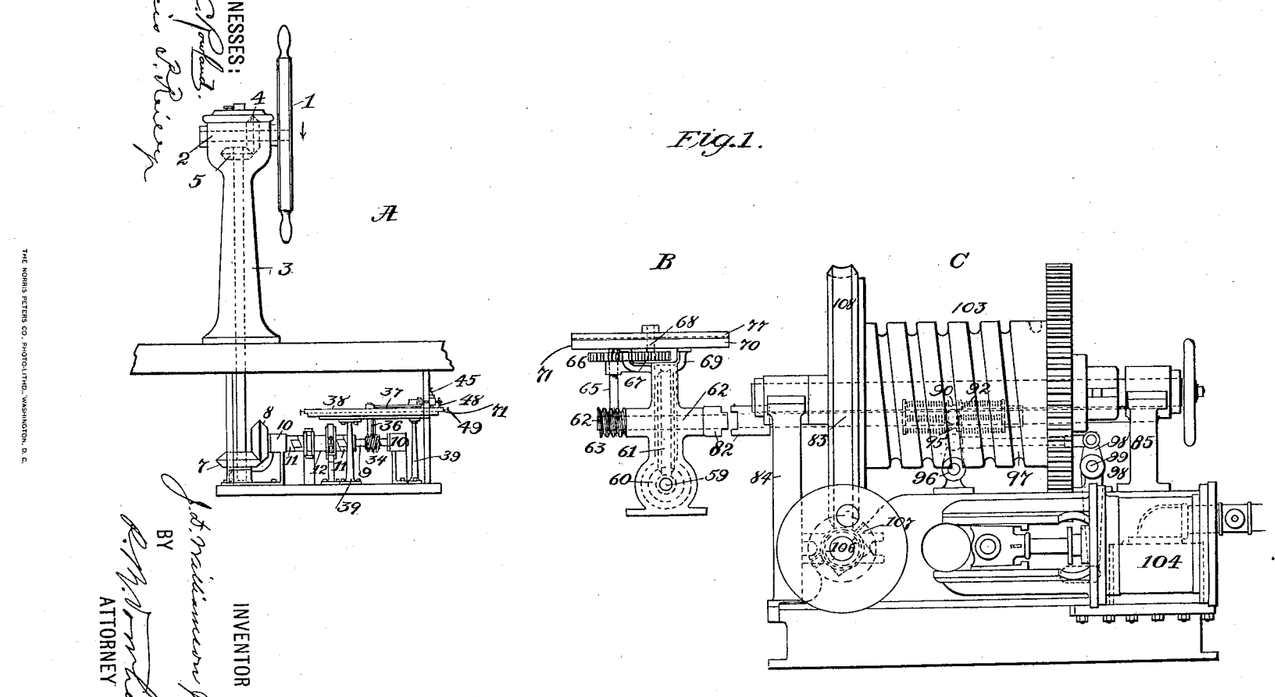
Figure 1 is a side elevation showing the application of my invention to a steam steering-engine.
Figure 2:
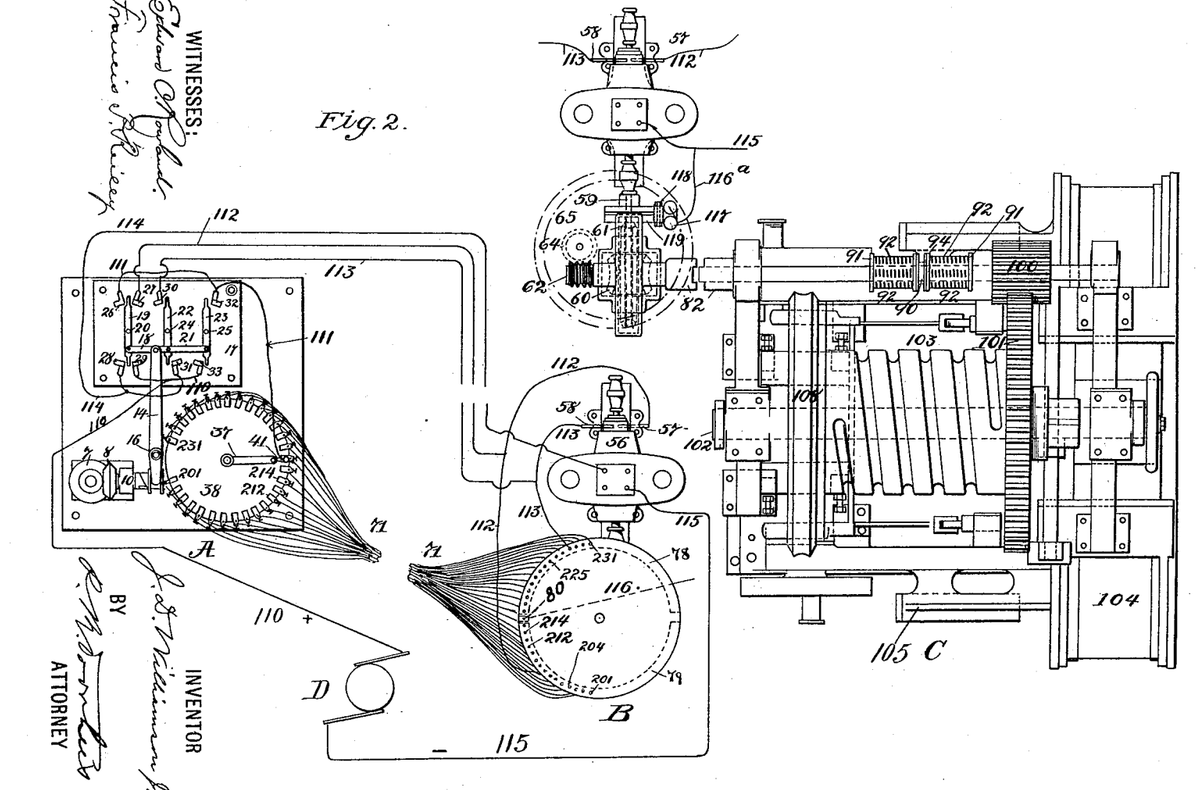
Fig. 2 is a view in plan of Fig. 1, certain parts being omitted and other parts shown detached for clearness of illustration.
Figures 3, 4:
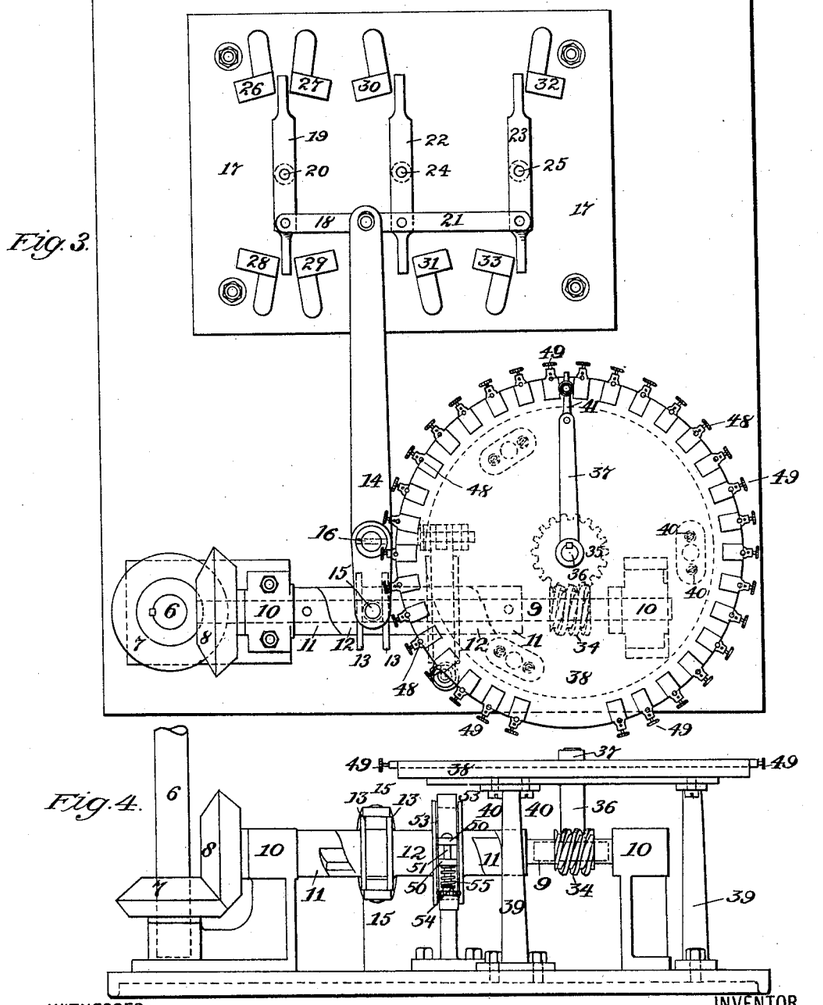
Fig. 3 is a view in plan, upon an enlarged scale, of the transmitting apparatus or current-transmitter shown in Figs. 1 and 2.
Fig. 4 is a side elevation of Fig. 3.

In said figures the several parts are respectively indicated by reference letters and numbers as follows:

The letter A, Figs. 1 and 2, indicates that portion of the complete telemotor which may be called the "transmitting apparatus" or "current-transmitter."

B indicates the receiving apparatus or combined current-receiver and circuit-interrupter, which is connected to an electric motor. C indicates a steering-engine connected to said motor, and D indicates a dynamo or other suitable source of electricity.

In the several figures of the drawings in which the numbers occur the number 1 indicates a steering-wheel mounted upon a horizontal shaft 2, carried in bearings in a column or standard 3, secured to the floor of the pilot-house or at any other desired point. The shaft 2 is provided with a bevel-wheel 4, which meshes with a bevel-wheel 5, secured to the upper end of a vertical shaft 6, extending below the deck of the vessel. At the bottom of said shaft 6 is a bevel-wheel 7, which meshes with a bevel-wheel 8, secured to a horizontal shaft 9, carried in bearings in standards 10. Surrounding the shaft 9 for a portion of its length are two fixed helical sleeves 11, engaging a loose helical sleeve 12. The sleeve 12 is provided with two disks or flanges 13, between which is secured the forked end of a lever 14 by means of bolts 15, secured to or forming part of said disks. The lever 14 is centered upon a shaft 16, and its other end leads to an electrical switchboard 17, where it is connected by means of a link 18 to a contact arm or lever 19, pivoted at the point 20. A link 21 also connects said lever 14 to contact-arms 22 and 23, pivoted, respectively, at the points 24 25. The arm 19 is adapted to open and close circuits by making contact with the contact-points 26, 27, 28, and 29, located on the switchboard 17. The arm 22 is adapted to open and close circuits by making contact with the contact-points 30 31, and the arm 23 by making contact with the contact-points 32 and 33. It is obvious that screw-threads may be substituted for the helical sleeves 11 12 on the shaft 9 for operating the lever 14.

Secured to or formed upon the shaft 9 is a worm 34, which meshes with a worm-wheel 35, carried on the lower end of a vertical shaft 36. To the upper end of the shaft 36 is secured an indicator-arm or pointer 37, adapted to move over a transmitting indicator-plate 38, secured to vertical standards 39 by means of screws 40. The indicator-arm or pointer 37, as shown in detail in Figs. 3, 5, 6, and 7, is provided with a contact-point 41, pivoted to the end of said arm by a pin 42 and provided with a spring 43, located in a recess 44, formed in the arm 37.

Figures 5, 6, 7, 8, 9:
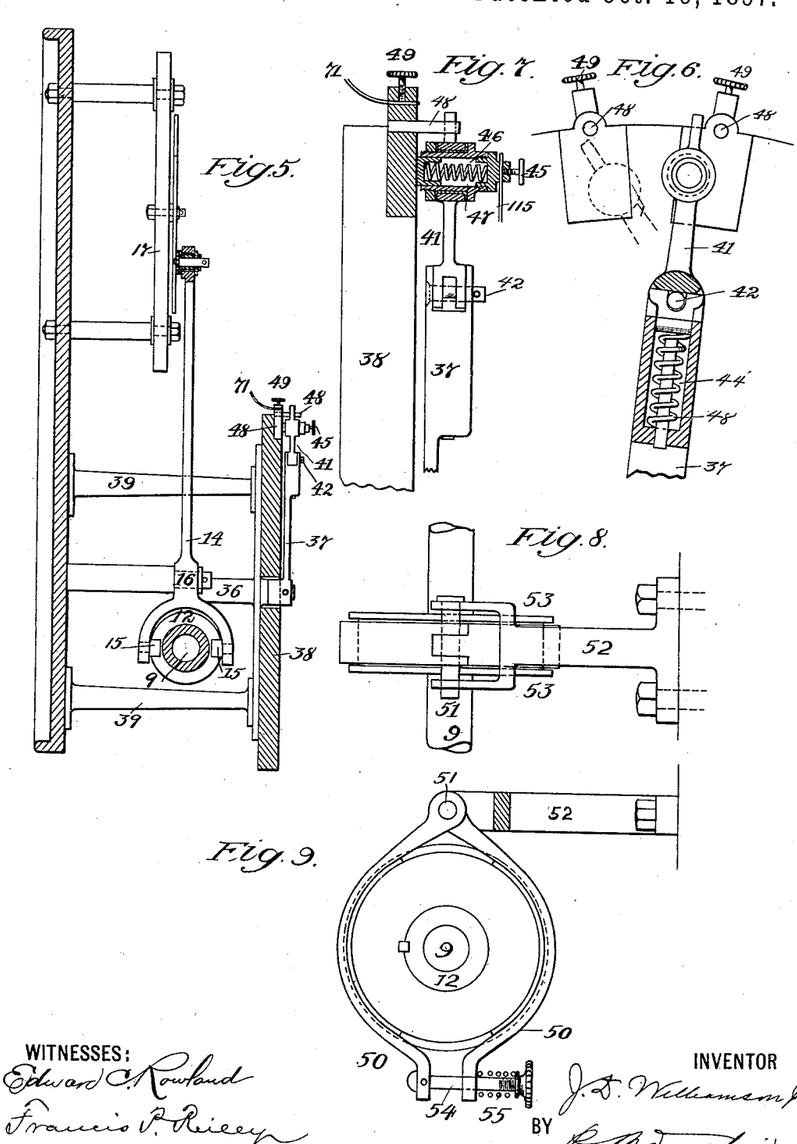
Fig. 5 is a sectional end view of Fig. 3.
Figs. 6 to 9, inclusive, illustrate, upon an enlarged scale, certain details of construction shown in Figs. 3, 4, and 5 and hereinafter described.

Distributed around the circumferential marginal surface of the plate 38 are vertical pins 48, against which the contact-point 41 of the indicator-arm 37 is adapted to impinge. When said indicator-arm is moved by the movement of the steering-wheel 1, the contact-point 41 will impinge against one of the pins 48, and thus cause said point to yield and assume the position shown in dotted lines in Fig. 6, compressing its spring 43. When said contact-point 41 passes the pin 48, its spring 43 will be released from compression and said contact-point will quickly fly into the desired position in line with the main body of the indicator-arm 37. This arrangement of pins and spring contact-point prevents sparking when moving the indicator-arm from point to point on the indicator-plate 38. The contact-point 41 is also provided, as shown in Fig. 7, with a binding-screw 45, adapted to receive a wire, and with a spiral spring 46, located within a recess 47. The spring 46 keeps the contact-point 41 of the arm 37 in contact with the segments or contact-points, numbered from 201 to 231, inclusive, distributed around the circumferential marginal surface of the plate 38, each of said segments or contact-points being provided with a binding-screw 49 for receiving a wire. Any desired number of segments or contact-points may be located on the plate 38.

The helical sleeve 12 is provided, as shown in Figs. 3, 4, 8, and 9, with a brake mechanism which prevents said sleeve from revolving until the arms 19, 22, and 23 have attained the desired positions. Said mechanism consists of a divided strap 50, secured by a pin 51 in the fork of a fixed bracket or standard 52. Said strap spans the loose helical sleeve 12, between two disks or collars 53 53, and its ends are connected by a pin and set-screw 54, provided with a spring 55, the whole device forming an automatic friction-brake.

The current-receiving and circuit-interrupting part B of the complete apparatus is shown in Figs. 1 and 2 and in detail in Figs. 10 to 15. The number 56 indicates an electric motor, which may be of any approved construction provided with brushes 57 58. To the shaft 59 of this motor is secured a worm 60, which meshes with a worm-wheel 61, mounted upon a horizontal shaft 62. Said shaft 62 is provided at one end with a worm 63 in mesh with a worm-wheel 64 at the bottom of a vertical shaft 65. The upper end of the shaft 65 is provided with a spur-pinion 66 in mesh with a spur gear-wheel 67 at the bottom of a vertical shaft 68. Mounted upon and secured to a standard 69 is a circular plate 70, to half of the circumferential upper marginal surface of which are secured a number of segments or contact-pieces numbered from 201 to 231, inclusive, and provided with binding-screws 72. The spaces between said segments are filled with insulating material, so that said segments and filling will present a level upper surface. The other half of the circumferential upper marginal surface of the plate 70 is provided with rollers 73, carried on pins 74, mounted in small brackets 75. The vertical shaft 68 passes loosely through a hole 76 in the center of the plate 70, and has fixed at its upper end a circular plate 77, the under surface of which rests upon the rollers 73 on the plate 70, upon which rollers said plate 77 is free to rotate when the shaft 68 is rotated. The under surface of the plate 77 is provided with two long segments or contact-pieces 78 79, and one short segment or contact-piece 80, each having a binding-screw 81. The spaces between said segments are filled with insulating material.

Figure 10:
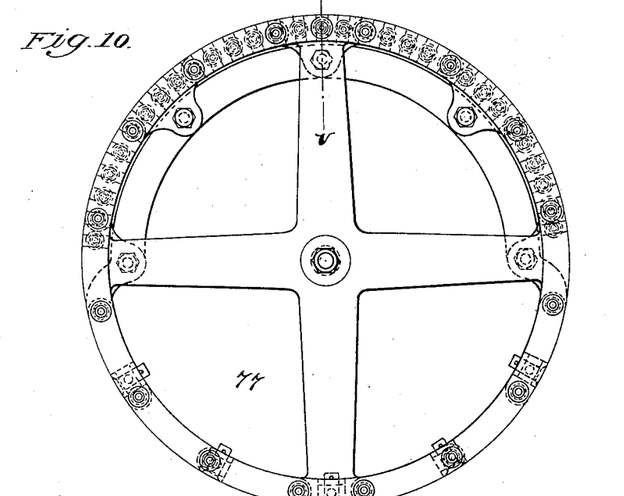
Fig. 10 shows in plan a portion of the receiving apparatus or current-receiver and circuit-interrupter shown in Figs. 1 and 2.
Figure 11:
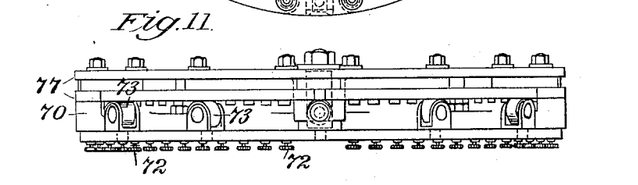
Fig. 11 is a side elevation of Fig. 10.
Figures 12, 13:
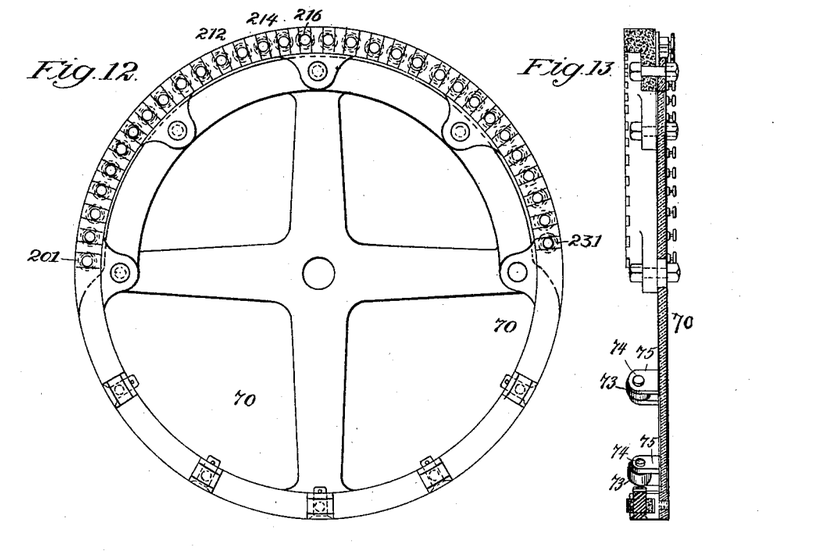
Fig. 12 is a view in plan of the plate marked 70 in Figs. 10 and 11.
Fig. 13 is a sectional side elevation of Fig. 12.
Figures 14, 15:
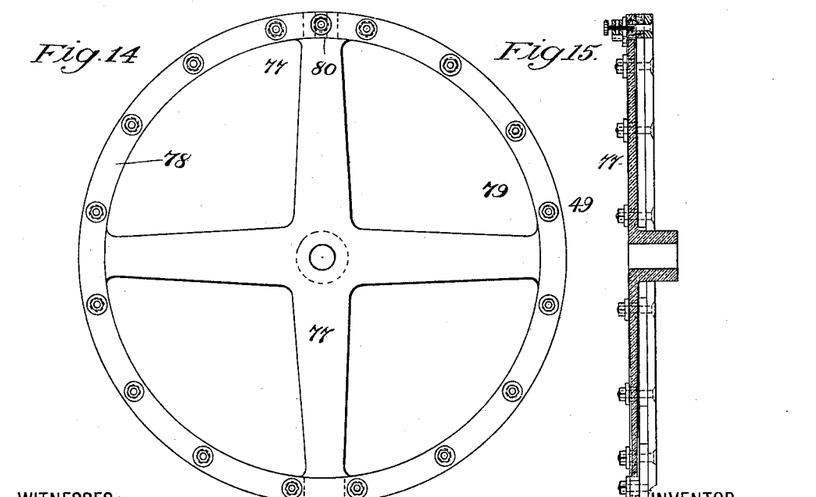
Fig. 14 is a view in plan of the plate marked 77 in Figs. 10 and 11.
Fig. 15 is a sectional side elevation of Fig. 14.

For clearness of illustration, the plates 70 and 77 are shown in Fig. 2 detached from the other parts of the receiving apparatus, the dotted lines a in said figure representing the proper position of said plates, as clearly shown in full lines in Fig. 1. Figs. 10 and 11 show said plates together, in detail, the rotary plate 77 being superposed upon the stationary plate 70. The stationary plate 70 is shown in detail detached in Figs. 12 and 13, and the rotary plate 77 is shown in detail detached in Figs. 14 and 15.

Figure 16:
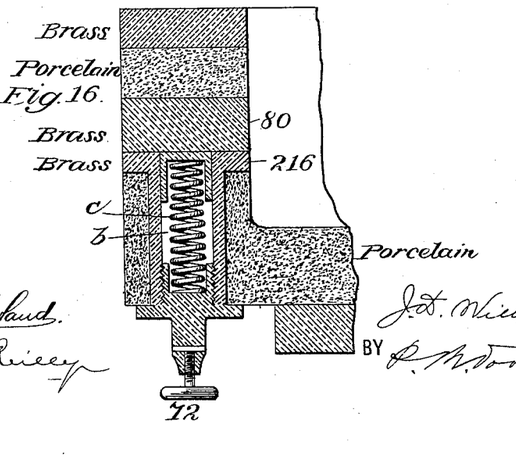
Fig. 16 is a vertical section taken through Fig. 10 at the line $v\,v$.

Fig. 16 is a vertical section taken through both plates 70 77 at the line v v, Fig. 10, showing the contact between the circuit-interrupting segment or contact-point 216 on the stationary plate 70 with the segment or contact-point 80 on the rotary plate 77. Each of the segments or contact-points numbered from 201 to 231, inclusive, on the plate 70 may be constructed as shown in said Fig. 16. As therein shown, said segments on the plate 70 are constructed of brass and porcelain or other suitable non-conductor, and are provided within a bore or tube b with a spring c, which insures perfect contact between said segments and the three segments on the rotary plate 77, which latter segments may also be made of brass and porcelain or other non-conductor, as shown. It is obvious, however, that said segments or contact-points may be constructed in any suitable manner, of any suitable material, and that any suitable device or contrivance for insuring contact between the segments on the plates 70 77 may be substituted for the spring arrangement shown.

Figure 17:
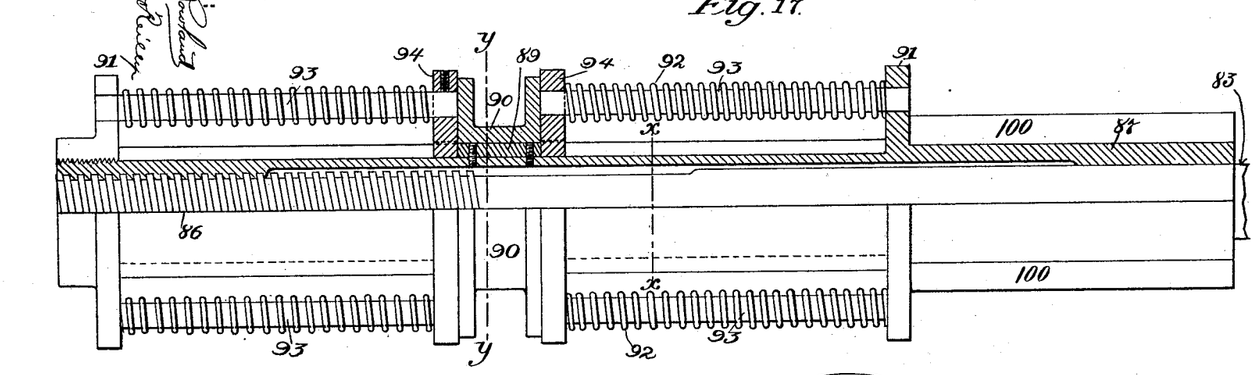
Fig. 17 is a sectional side elevation of the valve-operating mechanism of the steering-engine, hereinafter described.
Figure 18:
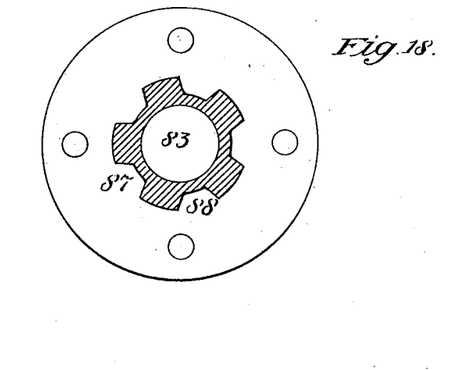
Fig. 18 is a vertical cross-section taken through Fig. 17 at the line $x\,x$.
Figure 19:
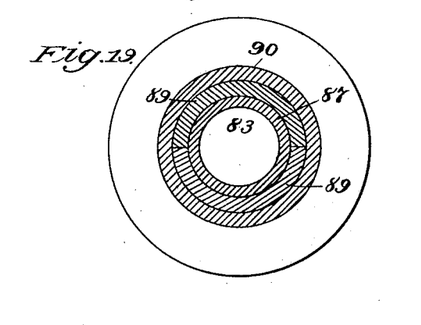
Fig. 19 is a vertical cross-section taken through Fig. 17 at the line $y\,y$.

The shaft 62 may be connected by means of a clutch 82, Figs. 1 and 2, to a shaft 83, which latter shaft, by means of mechanism now to be described, is adapted to operate the controlling-valve of the steering-engine, (represented generally by the letter C.) The shaft 83 is carried in bearings in the standards 84 85, and is provided for a portion of its length with screw-threads 86, as shown in Fig. 17. Fitted to and surrounding this screw-threaded shaft is a long sleeve or nut 87, preferably provided with a grooved surface 88. At or near the central part of said sleeve or nut the projections forming the grooves are cut away and two half-rings 89 are fitted in, as clearly shown in Figs. 17 and 19. A flanged ring or annular casting 90, which derives movement from the sleeve 87, is held in position between two fixed collars 91 (secured to the sleeve 87) by springs 92, supported and sliding upon rods 93, secured to movable collars 94, said collars 94 being grooved, so as to fit into the grooves in the sleeve 87. The ring 90 can move laterally over the entire grooved surface of the sleeve 87 until the springs 92 at one side of said ring are fully compressed. The collars 94 are held by said springs against the two half-rings 89, and said collars can move no farther inwardly than their central positions of original adjustment.

Connected to the ring 90 is a lever 95, Fig. 1, pivoted at the point 96 and having connected thereto a rod 97. To the rod 97 is connected one end of a double-armed lever 98, pivoted at the point 99, the other end of said lever being connected to the valve-rod of the steering-engine.

The sleeve 87 has secured to it, near one end, a spur-pinion 100, Fig. 2, which gears with a gear-wheel 101 on the drum-shaft 102 of the steering-engine. Said shaft 102 carries the usual chain-drum 103, operated from the cylinders 104 by connecting-rods 105, crank-shaft 106, and worm-gearing 107 108.

Leading from a dynamo D, or from a battery or other suitable source of electricity, to the contact-points 29 and 33 on the switchboard 17 is a wire 110. A wire 111 connects the two contact-points 26 and 32 and leads to the contact-point 41 on the indicator-arm 37, to which it is secured by the binding-screw 45. From the brush 57 of the motor 56 is led a wire 112, which connects with the segment 78 on the rotary plate 77 and also with the contact-point 27 on the switchboard 17. Another wire 113 leads from the brush 58 to the segment 79 on the rotary plate 77 and also to the contact-point 30 on the switchboard 17. A wire 114 connects with the two contact-points 28 and 31 on said switchboard and leads to the field of the motor 56, and from said field a wire 115 leads to the dynamo D. If desired, said field may be excited through a separate circuit.

The segments or contact-points on the indicator-plate 38 are numbered from 201 to 231, inclusive, and to each of said contact-points is secured, by means of the binding-screws 49, one end of a series of wires 71, the other ends of which are connected to the segments or contact-points, likewise numbered from 201 to 231, on the stationary plate 70, their ends being secured to said points by the binding-screws 72. A wire 116 leads from the circuit-interrupting segment 80 on the rotary plate 77 to an electromagnet 117, and a wire 116ª connects said magnet with the wire 115, which leads to the source of electricity. To the armature of said magnet is secured a brake-shoe or brake-bar 118, said magnet being adapted, when excited by a current of electricity, to apply said brake-shoe to a brake-wheel 119 on the shaft 59 of the motor 56 and thus arrest the momentum of the motor.

Figure 20:
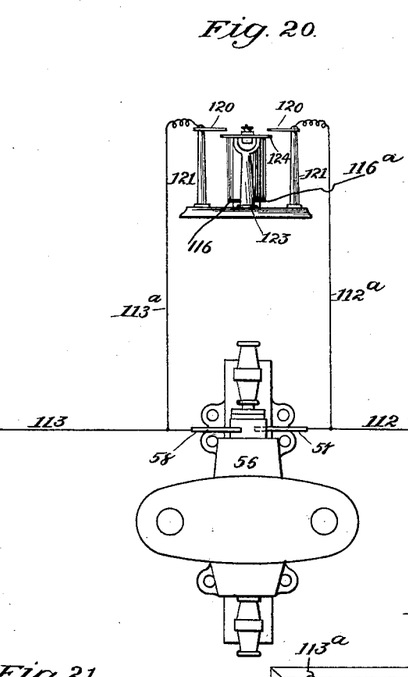
Fig. 20 shows in plan an electric motor and in end elevation a modified form of brake mechanism for arresting the momentum of said motor.
Figure 21:
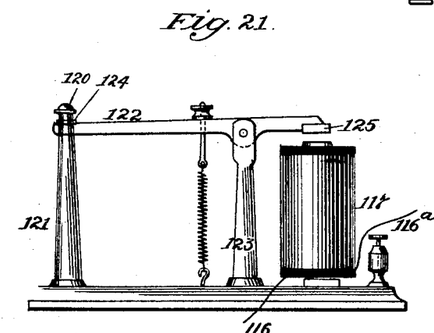
Fig. 21 is a side elevation of the brake mechanism shown in Fig. 20.
Figure 22:
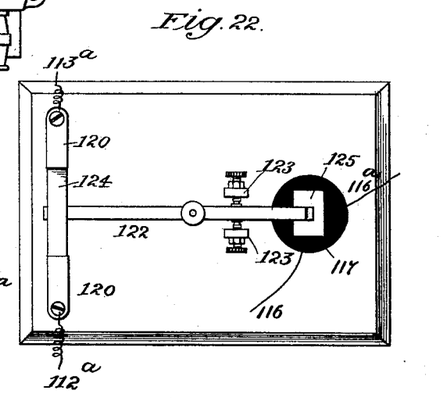
Fig. 22 is a view in plan of Fig. 21.

Instead of operating a brake-shoe, the magnet and its armature may be suitably located and adapted to operate a brake-bar to "short-circuit" the wires 112 113 by making contact therewith near the motor, as illustrated in Figs. 20, 21, and 22. In said figures the wires 112 113 are shown connected by wires 112ª 113ª to metal strips or bars 120, located at the top of two standards 121. A lever, or short-circuiting brake-bar 122 of non-conducting material, is fulcrumed in bearings 123 and is provided at one end with a conducting metal strip or bar 124, adapted to make contact with the metal strips 120, and is also provided at its other end with an armature 125 for the magnet 117. It will be obvious that when the magnet 117 is excited by a current of electricity from the wires 116 116ª, said magnet will attract the armature 125 on the lever 122 and cause the bar 124 on said lever to make contact with the strips 120 to which the wires 112 113 are connected, and thus establish a short-circuit between said wires, which are connected to the armature-brushes of the motor. The momentum of the motor will thus be arrested quickly, by reason of the resistance met with by the current of electricity tending to be generated by the motor (temporarily converted into a dynamo) by the momentum of its armature after the motor's circuit with its source of electricity has been broken by the circuit-interrupting contact-point 80 on the rotary plate 77, as hereinafter described. It is obvious that other forms of electric telemotor than the one herein described may be used with the forms of brake mechanism above described for arresting the momentum of the motor. Either of said forms of brake mechanism may be used, but if the field of the motor 56 be excited by a separate circuit I prefer to use the short-circuiting arrangement of brake mechanism above described.

The operation of the complete apparatus is as follows: If the hand-wheel 1 be moved in the direction of the arrow, Fig. 1, such movement will revolve the shaft 2, and, by means of the bevel-wheels 4, 5, 7, and 8 and the vertical shaft 6, will also revolve the horizontal shaft 9. This revolution of the shaft 9 will, by means of the helical sleeves 11 12, move the upper end of the lever 14 to the right, thus causing the ends of the arm 19 to engage the contact-points 26 and 29 on the switchboard 17, and the ends of the arm 22 to engage the contact-points 30 31, the arm 23 being out of engagement. Said revolution of the shaft 9 will also, by means of the worm 34 thereon and the gear-wheel 35, revolve the vertical shaft 36 and move the indicator-arm 37 over the indicator-plate 38 the desired distance to a point representing the desired position of the rudder. When said indicator-arm has reached the desired point, say over the contact-point 212, the movement of the hand-wheel 1 is stopped. The electric current then entering from the dynamo D through the wire 110 flows through the contact-point 29 and lever 19 to the contact-point 26, thence through the wire 111 to the contact-point 41 on the indicator-arm 37 to the contact-point 212 on the plate 38. From said contact-point 212 the current passes through one of the wires 71 to the correspondingly-numbered contact-point 212 on the stationary plate 70, thence to the segment 78 on the plate 77 and through the wire 112 to the brush 57 of the motor 56, out from the brush 58, through the wire 113, back to the lever 22 and contact-points 30 31 on the switchboard 17, back to the field of the motor through wire 114 and out through the main wire 115 to the dynamo D, thus completing the circuit. When said current enters the motor 56 from the wires 112 and 114, it starts said motor in operation and revolves its shaft 59. This revolution of said shaft will, by means of the gears 60 and 61, revolve the shaft 62 and, the clutch 82 being thrown in, will also revolve the shaft 83. As said shaft 83 revolves, the screw-threads 86 thereon cause the sleeve or nut 87 to slide laterally, carrying with it the flanged ring or annular casting 90. This movement of the ring 90 will, through the instrumentality of the lever 95, rod 97, and lever 98, open the controlling valve or valves of the steering-engine, and thus cause said engine to move the rudder into the desired position. The valve is held open until the movement of the steering-engine causes the gear-wheel 101 on the drum-shaft 102 to revolve the pinion 100. This revolution of the pinion 100 will cause the sleeve 87, to which it is secured, to rotate on the screw-threaded shaft 83 and move backward, thus returning the ring 90 and lever 95 to their original positions and closing the controlling-valve of the engine. The springs 92 are made strong enough to effect the movement of the ring 90 in both directions.

Should the valve of the engine stick in its seat or reach the end of its stroke while the shaft 83 is revolving, the ring 90 will cease its lateral movement, the sleeve or nut 87, however, continuing to slide laterally until the springs 92 on one side or the other of said ring, as the case may be, are compressed. Said springs will thus perform the important function of preventing breakage of any of the valve connections. I do not herein claim *per se* this spring mechanism for operating the valve of the steering-engine, as said mechanism is claimed by me in another application for Letters Patent filed herewith and bearing the serial number 511,344. In the meantime, while the valve-operating mechanism just described is being set in operation by the revolution of the shaft 62, said shaft, by means of the screw-threads 63 thereon and the pinion 64, revolves the vertical shaft 65. This revolution of the shaft 65 will, by means of the gear-wheels 66 67 and shaft 68, cause the circular plate 77 to rotate on top of the stationary plate 70. When the segment 80 on said rotary plate 77 arrives over the circuit-interrupting contact-point 212, through which the current of electricity is flowing, the circuit is interrupted and said current is thereby diverted from the motor 56, which ceases to operate. Said current then flows through said segment 80 and the wire 116 to the electromagnet 117, thus establishing a new circuit with the generator through the wire 116$^a$ and exciting said magnet and causing it to apply the brake-shoe 118 to the brake-wheel 119 on the shaft of the motor or to short-circuit the wires 111 112, in either event arresting the momentum of the motor.

If the hand-wheel 1 be moved in the opposite direction to that above described, such movement will cause the upper end of the lever 14 to move to the left and the arm 19 to engage the contact-points 27 28 on the switchboard 17, and the ends of the arm 23 to engage the contact-points 32 33, the arm 22 being out of engagement. Said movement of the steering-wheel 1 will also cause the indicator-arm 37 to move from the point 212 to the desired point on the indicator-plate 38, say the point 214. The current of electricity then flows from the main, through the wire 110 and arm 23, to the contact-points 33 32, thence through the wire 111 to the contact-point 41 on the indicator-arm 37 to the point 214 on the plate 38. From said contact-point 214 the current passes through one of the wires 71 to the correspondingly-numbered contact-point 214 on the stationary plate 70, thence to the segment 79 on the plate 77, and through the wire 113 and brush 58 to the motor 56 out through the brush 57 and wire 112, back to the contact-points 27 28 on the switchboard 17, back to the motor through wire 114 and out through the main wire 115 to the dynamo. As said current enters the motor 56 it will cause said motor to set in operation the valve-operating devices, above described, in the opposite direction, and also cause the plate 77 to rotate until the circuit-interrupting segment 80 thereon is brought over the contact-point 214 on the stationary plate 70, when the current will be diverted from the motor through the wire 116 to the magnet 117, thus stopping the motor and arresting its momentum by the brake mechanism, as before described. If desired, all braking mechanism for arresting the momentum of the motor may be omitted, as such mechanism is not essential to the successful operation of the apparatus. In such case the wire 116, leading from the circuit-interrupting contact-point 80 on the rotary plate 77 may be dispensed with, so that the circuit will be broken when said contact-point arrives over the contact-point on the stationary plate 70, through which the current is flowing.

The electric telemotor herein described, as a practical and efficient device, may be constructed so as to be both durable and very certain in action, having no parts whose action can be easily deranged so long as the integrity of the wires necessary to the several circuits shall be undisturbed. Its comparative simplicity of construction will be manifest as soon as its parts and connections and their operation are clearly understood. If applied to the steering of a ship, a helmsman of ordinary intelligence can steer the ship by merely turning, in the usual manner, a small hand-wheel with the exercise of but little manual exertion.

I do not confine myself, except as may be hereinafter specifically claimed, to the precise arrangement and combination of parts shown in the drawings, as they may be varied without departing from my invention. The shafting and gearing shown for operating the several parts may be replaced by other equivalent operating mechanism. Any suitable steering-engine, operated by steam or other fluid, may be substituted for the steering-engine C, or said engine may be entirely omitted, as it is obvious that the motor 56, if made large enough to develop adequate power, may operate the rudder itself instead of the valve of the engine, or that such a motor may operate the starting and stopping gear of a larger electric motor, any steam-engine, a turn-table, or any other mechanism, in particular where motion of an intermittent character is desired.

Having thus fully described my invention, I claim—

1. In an electric telemotor, the combination of an electric generator; a current-transmitter provided with numerous contact-points for regulating the extent of movement of the object to be moved; a combined current-receiver and circuit-interrupter electrically connected with the contact-points on said transmitter and provided with a series of stationary contact-points and with a series of movable contact-points, one of the latter being a circuit-interrupting contact-point connected by a wire with the generator; an electric motor electrically connected with said receiver and interrupter; and means for mechanically operating said interrupter so as to cause its said circuit-interrupting contact-point to interrupt the circuit to the motor and simultaneously establish a new circuit with the generator through said wire.

2. In an electric telemotor, two fixed plates provided with contact-points in circuit, a movable contact-arm on one of said plates, and a rotary plate on the other of said plates, provided with a series of contact-plates in combination with an electric motor in the same circuit and mechanically connected to said rotary plate to impart motion to the same.

3. In an electric telemotor, a current-transmitter having in combination a switchboard provided with contact-points; a shaft provided with one loose and two fixed helical sleeves; a lever secured to said loose sleeve and adapted to open and close circuits at the contact-points on said switchboard; means for preventing the revolution of said loose sleeve before the proper time; and means for revolving said shaft in both directions independently of the electric motor.

4. In an electric telemotor, a current-transmitter having in combination a switchboard provided with contact-points; a shaft provided with one loose and two fixed helical sleeves; a lever secured to said loose sleeve and adapted to open and close circuits at the contact-points on said switchboard; a friction-brake mechanism on said loose sleeve; and means for revolving said shaft.

5. In an electric telemotor, a current-transmitter having in combination a switchboard provided with contact-points; a shaft provided with one loose and two fixed helical sleeves; a lever secured to said loose sleeve and adapted to open and close circuits at the contact-points on said switchboard; an adjustable friction-strap surrounding said loose sleeve; and means for revolving said shaft.

6. In an electric telemotor, a current-transmitter having in combination an indicator-plate provided with contact-points; an indicator-arm secured to a shaft and provided with a contact-point adapted to make contact with the contact-points on said plate; a worm-wheel on said shaft; a shaft provided with a worm in mesh with said worm-wheel; a switchboard provided with contact-points; one loose and two fixed helical sleeves mounted on said worm-shaft; a lever secured to said loose sleeve and adapted to make contact with the contact-points on said switchboard; means for preventing the revolution of said loose sleeve before the proper time; and means for revolving said worm-shaft.

7. In an electric telemotor, a current-transmitter having in combination an indicator-plate provided with contact-points; an indicator-arm secured to a shaft and provided with a contact-point; a worm-wheel on said shaft; a shaft provided with a worm in mesh with said worm-wheel; one loose and two fixed helical sleeves mounted on said worm-shaft; a switchboard provided with eight contact-points; a lever having one end secured to said loose sleeve and provided at its other end with arms adapted to open and close circuits at the contact-points on said switchboard; means for preventing the revolution of said loose sleeve before the proper time; and means for revolving said worm-shaft.

8. In an electric telemotor, a current-transmitter having in combination an indicator transmitting-plate provided on its circumferential marginal surface with numerous contact-points, insulated from each other, for regulating the extent of movement of the object to be moved; vertical pins projecting from each of said contact-points; an indicator-arm adapted to move over said plate and having a contact-point pivoted to its end for transmitting the current to the contact-points on said plate; and a coiled spring, located within a longitudinal recess in said arm, for the automatic adjustment of said contact-point.

9. In an electric telemotor, a current-transmitter having in combination an indicator transmitting-plate provided on its circumferential marginal surface with numerous contact-points, insulated from each other, for regulating the extent of movement of the object to be moved; vertical pins projecting from each of said contact-points; an indicator-arm having a yielding, self-adjusting, contact-point pivoted to its end for transmitting the current to the contact-points on said plate; and a coiled spring, located within a vertical recess in said arm, for insuring contact between said contact-point and the contact-points on said plate.

10. In an electric telemotor, a combined current-receiver and circuit-interrupter having in combination a member provided with numerous electrical contact-points and a member provided with a circuit-interrupting contact-point and with two longer contact-points independent of each other and of said circuit-interrupting point, one of said members being adapted to rotate in proximity to the other.

11. In an electric telemotor, a combined current-receiver and circuit-interrupter having in combination a member provided with numerous electrical contact-points, and a member provided on its outer marginal surface with a small segmental circuit-interrupting contact-point and with a long segmental contact-point on each side of said circuit-interrupting point and independent thereof, one of said members being adapted to rotate in proximity to the other and cause said segmental contact-points on one member to take an electric current from the contact-points on the other member.

12. In an electric telemotor, the combination of the following-named elements; a combined current-receiver and circuit-interrupter having a member provided with numerous contact-points, and a member provided with a circuit-interrupting contact-point and with two longer contact-points; an electric motor; and wires directly connecting said motor with said longer contact-points, so that a current taken from the other member by said contact-points is transmitted through said wires to said motor.

13. In an electric telemotor, the combination of the following-named elements; a combined current-receiver and circuit-interrupter having a member provided with numerous contact-points, and a member provided with a circuit-interrupting contact-point and with two longer contact-points; an electric motor, and wires connecting said motor with said longer contact-points; one of said members being operated by said motor so that its rotation will cause said circuit-interrupting contact-point to take the current and thereby interrupt the circuit to the motor.

14. In an electric telemotor, a combined current-receiver and circuit-interrupter having in combination a plate provided with numerous contact-points, and a plate provided with a circuit-interrupting contact-point and with a contact-point on each side of said interrupting-point, one of said plates being adapted to rotate in proximity to the other.

15. In an electric telemotor, a combined current-receiver and circuit-interrupter, having in combination a plate provided with numerous contact-points, and a plate provided with one short segmental circuit-interrupting contact-point and with a long segmental contact-point on each side of said interrupting-point, one of said plates being adapted to rotate in proximity to the other.

16. In an electric telemotor, a current-receiver having in combination, a stationary plate provided with contact-points and rollers, and a rotary plate adapted to rotate on said rollers and provided with contact-points.

17. In an electric telemotor, a current-receiver having, in combination, a stationary plate provided on its upper surface with contact-points and rollers, and a rotary plate supported upon said rollers and provided on its lower surface with one short and two long segmental contact-points.

18. In an electric telemotor, a current-receiver having, in combination, a stationary plate provided on its upper surface with contact-points and rollers, and a rotary plate supported on said rollers and provided on its lower surface with contact-points, each of the contact-points on said stationary plate being provided with a spring device for keeping them in contact with the points on said rotary plate.

19. In an electric telemotor, the combination of a combined current-receiver and circuit-interrupter having a stationary plate provided with numerous contact-points, and a rotary plate provided with a circuit-interrupting contact-point and a contact-point on each side of said interrupting-point; an electric motor; and means connecting said motor with said rotary plate so as to rotate the same to cause its circuit-interrupting contact-point to interrupt the circuit to the motor.

20. An electric telemotor having the following-named elements in combination; a current-receiver having a stationary plate provided with contact-points and a plate superposed upon said stationary plate and provided with contact-points; an electric motor provided with a shaft and connected by wires with said superposed plate; a worm on said motor-shaft in mesh with a worm-wheel secured to a second shaft; a worm on said second shaft in mesh with a worm-wheel secured to a third shaft having also a spur-pinion thereon; and a shaft secured to said superposed plate and provided with a spur gear-wheel in mesh with said spur-pinion.

21. In an electric-telemotor system, the combination of the following-named elements: a combined current-receiver and circuit-interrupter having a stationary member and a rotary member each provided with contact-points; an electric motor electrically connected with said receiver; and a shaft, operated by said motor, connected to the valve or valve-rod of an engine by yielding or spring connections constructed and arranged so as to operate said valve in both directions without compression of the springs and to prevent breakage of the valve connections by the compression of said springs at the proper time.

22. In an electric telemotor, the combination of the following-named elements: a current-transmitter; a combined current-receiver and circuit-interrupter having a stationary member provided with contact-points and a rotary member provided with contact-points, one of which is a circuit-interrupting contact-point; an electric motor; an electromagnet electrically connected to said circuit-interrupting contact-point; and means operated by said magnet to arrest the momentum of said motor.

23. In an electric telemotor, the combination of the following-named elements: a current-transmitter; a combined current-receiver and circuit-interrupter having a stationary member provided with contact-points and a rotary member provided with contact-points, one of which is a circuit-interrupting contact-point; an electric motor; an electromagnet electrically connected with said circuit-interrupting contact-point; and a short-circuiting bar operated by said magnet to arrest the momentum of the motor.

24. In an electric telemotor, the combination of the following-named elements: an indicator-transmitting plate provided with numerous contact-points for regulating the extent of movement of the object to be moved; an indicator-arm provided with a contact-point for transmitting the current to the contact-points on said plate; means for moving said arm over said plate; a current-receiver having two members, one provided with numerous contact-points, and the other provided with contact-points, one of which is a circuit-interrupting point; and wires connecting the contact-points on said indicator-plate with the contact-points on one of the members of said receiver.

25. In an electric telemotor, the combination of the following-named elements: a switchboard provided with contact-points; a lever adapted to open and close circuits at said points; an indicator-plate provided with contact-points; an indicator-arm provided with a contact-point; means for mechanically and simultaneously operating said lever and said indicator-arm; a current-receiver having a stationary member provided with numerous contact-points and a rotary member provided with contact-points one of which is a circuit-interrupting contact-point; an electric motor; wires connecting said indicator-plate with said stationary member; wires connecting said motor with said switchboard and said rotary member; and mechanism connecting said motor with said rotary member so as to rotate the same.

26. In an electric telemotor, the combination of the following-named elements: an indicator-plate provided with numerous contact-points for regulating the extent of movement of the object to be moved; an indicator-arm secured to a shaft and provided with a contact-point; means for rotating said shaft; a current-receiver having a stationary member and a rotary member each provided with contact-points, the contact-points on said stationary member being equal in number to those on said indicator-plate and connected thereto by wires, and one of the contact-points on said rotary member being a circuit-interrupting point; an electric motor; wires connecting said rotary member with said motor; and mechanism connecting said motor with said rotary member so as to rotate the same to interrupt the circuit to the motor.

27. In an electric telemotor, the combination of the following-named elements: an indicator-plate provided with numerous contact-points for regulating the extent of movement of the object to be moved; an indicator-arm secured to a shaft and provided with a contact-point; means for rotating said shaft; an electric motor; a current-receiver having a member provided with numerous contact-points severally connected by wires with the contact-points on said indicator-plate, and a member provided with a circuit-interrupting contact-point and with contact-points connected by wires with said motor; and mechanism connecting said motor with one of said members so as to rotate the same to interrupt the circuit to the motor.

28. In an electric telemotor, the combination of the following-named elements: an indicator-plate provided with numerous contact-points for regulating the extent of movement of the object to be moved; an indicator-arm provided with a contact-point; a switchboard provided with contact-points; a lever adapted to open and close circuits at the contact-points on said switchboard; means for mechanically and simultaneously operating said indicator-arm and said lever; a current-receiver having a stationary member provided with numerous contact-points and a rotary member provided with contact-points one of which is a circuit-interrupting contact-point; an electric motor; gearing connecting said motor to said rotary member; wires connecting said indicator-plate with said stationary member; and wires connecting said motor with said switchboard and said rotary member.

29. In an electric telemotor, the combination of the following-named elements: an indicator-plate provided with contact-points; an indicator-arm secured to a shaft and provided with a contact-point; a worm-wheel on said shaft; a shaft provided with a worm in mesh with said worm-wheel; one loose and two fixed helical sleeves mounted on said worm-shaft; a switchboard provided with contact-points; a lever secured to said loose sleeve and adapted to make contact with the contact-points on said switchboard; means for preventing the revolution of said loose sleeve before the proper time; means for revolving said worm-shaft; a current-receiver having a stationary member and a rotary member each provided with contact-points; an electric motor; wires connecting said indicator-plate with said stationary member; wires connecting said motor with said rotary member and said switchboard; and mechanism connecting said motor with said rotary member so as to rotate the same.

30. In an electric telemotor, the combination of the following-named elements: a current-transmitter having an indicator-plate provided with numerous contact-points, for regulating the extent of movement of the object to be moved, and an indicator-arm provided with a contact-point; a current-receiver having a stationary member and a rotary member each provided with contact-points, the contact-points on said stationary member being equal in number to those on said indicator-plate, and one of the contact-points on said rotary member being a circuit-interrupting point; an electric motor; wires connecting the contact-points on said indicator-plate with those on said stationary member; wires connecting said rotary member with said motor; and a shaft operated by said motor, connected to the valve-rod of an engine.

31. In an electric-telemotor system, the combination of the following-named elements: an indicator-plate provided with numerous contact-points for regulating the extent of movement of the object to be moved; an indicator-arm provided with a contact-point; a switchboard provided with contact-points; a lever adapted to open and close circuits at the contact-points on said switchboard; means for mechanically and simultaneously operating said indicator-arm and said lever; a current-receiver having a stationary member provided with numerous contact-points and a rotary member provided with contact-points one of which is a circuit-interrupting contact-point; an electric motor; a power-transmitting shaft; gearing connecting said motor to said rotary member and to said shaft; wires connecting said indicator-plate with said stationary member; and wires connecting said motor with said switchboard and said rotary member.

JOHN D. WILLIAMSON, Jr.

Witnesses:
C. WESLEY RUFFELL,
WILLIAM D. CLOUDS.